United States Patent [19]

Loran et al.

[11] 4,038,453

[45] July 26, 1977

[54] LEADER STRIP FOR MOTION PICTURE FILM

[75] Inventors: Thomas J. Loran, Boulder; Virgil R. Friebel, Longmont; Robert P. Pardee, Boulder, all of Colo.

[73] Assignee: Ball Brothers Research Corporation, Boulder, Colo.

[21] Appl. No.: 613,719

[22] Filed: Sept. 15, 1975

[51] Int. Cl.[2] .......................... B32B 27/14; B32B 5/16

[52] U.S. Cl. .................................... 428/325; 352/235; 428/327; 428/335; 428/336; 428/413; 428/425; 428/454; 428/481; 428/483; 428/507; 428/509; 428/510; 428/536; 96/78

[58] Field of Search ............... 428/325, 327, 536, 413, 428/454, 481, 425, 483, 507, 509, 510, 335, 336; 352/235; 96/78

[56] References Cited

U.S. PATENT DOCUMENTS

| | | | |
|---|---|---|---|
| 2,091,694 | 8/1937 | Taylor | 96/78 |
| 2,286,834 | 6/1942 | Rittenhouse | 352/235 |
| 2,606,409 | 8/1952 | Gordon | 352/235 |
| 2,770,555 | 11/1956 | Cornwall | 428/536 |
| 2,812,279 | 11/1957 | Nadeau | 428/536 |
| 2,909,449 | 10/1959 | Banigan | 428/327 |
| 3,078,759 | 2/1963 | Brunswick | 352/235 |
| 3,227,576 | 1/1966 | Van Stappen | 428/327 |
| 3,259,537 | 7/1966 | Battista | 428/536 |
| 3,515,626 | 6/1970 | Duffield | 428/325 |
| 3,706,589 | 12/1972 | Fukuda | 428/327 |
| 3,849,191 | 11/1974 | Earhart | 428/327 |

*Primary Examiner*—Ellis Robinson
*Attorney, Agent, or Firm*—Gilbert E. Alberding

[57] ABSTRACT

Leader strip for motion picture films is described which is composed of a substrate of cellulose acetate or polyester, a gum-removing layer comprising an organic binder selected from the group consisting of cellulose esters, polyurethanes, polyacrylonitrile, copolymers of acrylonitrile and vinylidene chloride, and epoxy resins, a gum-shearing agent of finely divided polymeric particles, said agent being bonded by the organic binder to the substrate, said gum-shearing agent being a member selected from the group consisting of polyesters, polyamides, polyimides and polyolefins, said polymeric particles having a size less than about five mils.

2 Claims, No Drawings

LEADER STRIP FOR MOTION PICTURE FILM

BACKGROUND OF THE INVENTION

1. Field of the Invention

The present invention relates to photography, and particularly to leader strips which are capable of being passed through a motion picture apparatus or projectors having a feeding mechanism therethrough. In particular, the present invention relates to a flexible leader strip capable of removing gum or accumulations of materials deposited upon motion picture equipment.

2. Description of the Prior Art

Various procedures and articles have been advocated and produced for leader strips and they usually involve applying various coatings to films in order to protect and condition the film as they pass through a photographic apparatus. As is noticed in actual practice, dust, debris, emulsion resins and gums of various types are formed upon the contact surfaces of motion picture projectors, cameras and similar apparatus. They accumulate upon various metal surfaces of such equipment that come in contact with the film and result in a continuous build-up thereon. These accumulations are collectively called and referred to herein as "gums". In particular, the film gate and certain other proximate and associated parts are susceptible to progressive build-ups of these gums derived from advancing film during travel through the equipment. The final result gives rise to a number of effects which cause marring or scratching of the surface of the film.

Various compositions have been advocated for cleaning and removing gums on the contacting surfaces of the motion picture and film-strip projectors and camera equipment. Such compositions must be routinely applied to remove the gums that have been deposited. Further, oftentimes it is necessary to almost dismantle the equipment in order to properly apply such chemical cleaning agents. Moreover, a number of conditioning and cleaning means have been developed which address themselves to this particular problem. In this regard, a number of abrasive or scraping compositions have been applied to a leader strip in order to remove any gums or emulsion build-up from the film gate portion of the apparatus. Many of these compositions had to function as an abrading as well as polishing strip. Most of these compositions are inorganic in nature and present rather abrasive material of extensive hardness to remove the build-up of emulsion. For an example, carborundum and various silicon-containing compositions or minerals have been used for removing gum build-up. Although most of these compositions have been used, there have been noticed a number of harmful and deleterious effects resulting from their application. The sharp, abrasive constituents used in the composition oftentimes cut into the metal gate portion and associated parts of the photographic apparatus. Thus, a number of compositions including jeweler's rouge have been used in conjunction with these abrading materials to polish the otherwise extensively scratched and marred gate portion and associated parts. Although various buffing and polishing ingredients have been incorporated with the abrading compositions, they have not proven adequate and satisfactory in the trade.

SUMMARY OF THE INVENTION

The present invention is to provide the art with a disideratum hitherto unsupplied; namely, a substantially non-abrasive, flexible strip capable of being passed through a motion picture apparatus having a mechanism for moving film therethrough, said strip having bonded upon at least one surface thereof a gum-removing layer, said layer comprising an organic binder, and a gum-shearing agent associated therewith of finely divided polymeric particles having a particle size less than about five mils. The surface upon which the gum-removing layer is bonded is one comprising cellulose esters or polyesters.

A principal object of the subject invention is to provide a leader strip having a composition which removes gums, including dirt, debris, emulsions, or other surface accumulations on motion picture projectors, photographic equipment, cameras and the like without any deleterious effect.

Another principal object of the subject invention is to provide a gum-removing device capable of protecting film and the like by subjecting contacting surfaces of photographic equipment and related equipment to a flexible leader strip having the ability to remove gums or surface accumulation without adverse cutting or abrading of the metallic surfaces associated with such equipment and thereby protecting subsequent films from damage.

Another object of this invention is to provide an article of manufacture having long effective life during use in projectors without producing scratching or marring of the equipment adapted to handle the film.

Another object of this invention is to provide a motion picture film base with a protective, non-abrasive layer which is flexible and may be bent substantially without loss of the gum-shearing layer therefrom.

These and other objects of the invention will become more readily apparent from the following detailed description.

DESCRIPTION OF THE PREFERRED EMBODIMENT

The attainment of one or more of the above objects of the invention is accomplished by forming upon a strip of motion picture film base a gum-removing layer comprising an organic binder selected from the group consisting of cellulose esters, polyurethanes, polyacrylonitriles, copolymers of acrylonitrile and vinylidene chloride, and epoxy resins, along with a gum-shearing agent selected from the group consisting of polyesters, epoxy polymers, polyamides, polyimides and polyolefins, said gum-shearing agent being in the form of finely divided particles having a particle size less than about five mils.

The surface of film upon which the gum-removing layer is bonded is one comprising cellulose esters, including cellulose acetate and the like as well as polyesters and the like.

In general, the gum-removing layer may be applied to the surface or substrate to be coated by applying a mixture of the ingredients thereto and allowing the more volatile components to evaporate.

As set forth hereinafter, the mixture comprising the binder, gum-shearing agent and a suitable solvent is applied to the film base substrate by various means, including dipping, spraying, brushing or any other means for treating the surface with said mixture so that a relatively thin coating is applied to at least one surface thereof. In general, the coated film is then allowed to dry in air, so that the organic solvent system is allowed to evaporate therefrom leaving an even dispersion upon the surface of gum-shearing agent bound to the substrate. The agent may be substantially spherical particles or some other configuration of organic material bound by specified binders to the film surface.

In general, the preferred leader strip film surfaces are produced from cellulose derivatives and, in particular, cellulose acetate. Although the specific chemical compositions herein contemplated are addressed to leader strip film materials comprising cellulose acetate other film forming compositions such as polyesters are also envisioned.

The gum-removing layer herein considered is one comprising an organic binder which preferably is a cellulose ester, polyurethane, polyacrylonitrile, copolymers of acrylonitrile and vinylidene chloride, or an epoxy resin. It has been found that combination of binders such as epoxy resins along with cellulose acetate and/or cellulose nitrate are preferred compositions for the particular application herein disclosed. A number of other cellulose esters may be used and include cellulose acetate-butyrate and cellulose acetate-propionate and mixtures thereof.

The solvent system employed in the preferred composition is one comprising a mixture of ketones and an alcohol. In particular, the use of methyl isobutyl ketone along with methyl ethyl ketone and methanol have been found most advantageous. Thus, it has been found that a mixture of at least ten to about 30 weight percent of methyl isobutyl ketone, about at least ten to about thirty weight percent methyl ethyl ketone, and about 40 to about 80 weight percent methanol, produce a preferred solvent system for the recited binder composition above. In general, it has been found that acetone may be readily substituted for at least part of the methyl ethyl ketone and methanol may be readily replaced in part by isopropyl alcohol and ethanol or both. This particular composition has been found to properly soften the surface of cellulose acetate film leader so as to readily allow the binder system to be affixed to the leader film surface. In general, the proportions of methyl isobutyl ketone, methyl ethyl ketone and methanol are in the weight ratio of 1:1:3. In effect, the particular solvent system disclosed herein readily dissovles the preferred organic binder combinations and at the same time slightly softens the leader strip film substrate in order to properly promote the necessary adhesion of the dried binder and gum-shearing agent.

The gum-shearing agent is an organic material. The organic materials found most useful herein include the polyesters, epoxy polymers, polyamides, polyimides, and the polyolefins. One skilled in the art would appreciate other conventional polymers suitable herein. A particularly useful polyester is polyterephthalate and a particularly useful polyamide has been found to be nylon. The gum-shearing agent may be generally one that is substantially spherical or bead-like in form. Seemingly, the spherical configuration allows the gum-shearing agent to assume any orientation and cannot be easily dislodged from the flexible substrate. The particular solvent system herein disclosed is one which does not readily attack the gum-shearing agent. It should be mentioned that the size of the particles is relatively important and it has been found that particles having an average size about 0.5 to 3 mils is most preferred. Upon drying there is formed an evenly dispersed distribution of particles in which the gum-shearing agent is about 0.1 to about 10 percent by weight of the total flexible film coating.

The mixtures comprising the ingredients hereindisclosed may be easily applied to one face or both faces of a film to be coated. The mixture may be applied by any conventional means and results in a generally tacky condition which upon solvent evaporation results in the deposition of a uniform dispersion of a gum-removing agent united to the film by means of the binder. The gum-removing agent is firmly anchored to the film substrate and is not removed upon extensive flexing thereof.

Although a wide range of gum-removing surface thicknesses may be readily applied to a given substrate, it has been found that coating thicknesses for the leader strip in the range of about 1 to about 1.5 mils are most advantageous in that coating thicknesses of this magnitude offer sufficient shearing force in contacting metal portions of motion picture, and film strip equipment and the like and have been found to maintain a very long operating life.

The length of leader strip to be employed to render favorable results may vary over a wide range. The particular flexible leader strip coating herein contemplated is uniformly distributed over the surface of from about twelve inches to about six feet of film which may be readily attached or spliced to a conventional photogaphic or motion picture film to serve as a leader or as a terminal portion. In operation when the flexible strip runs or passes through the photographic apparatus the gum-removing surface comes in direct contact with the metal portions of the film gate and related parts readily removing and stripping away any accumulated dirt, debris and built-up emulsion on said parts and portions. Generally, the thickness of leader strip exceeds that of the film. This increase in thickness has the advantage in thoroughly removing gum or emulsion build-up from the apparatus.

The invention may be illustrated by the following examples.

EXAMPLE I a flexible leader strip coating composition was prepared by mechanically mixing in a stainless steel container about 275 grams of No. 2118 green pigment containing a mixture of 60% epoxy and 40% pigment solids, 440 grams of No. 2154 grey pigment containing a mixture of 50% epoxy and 50% pigment solids, and 82.5 grams of No. 2437 yellow pigment containing a mixture of 50% epoxy and 50% pigment solids, said pigments manufactured by Plastic Color Division, Crompton and Knowles Corporation, P.O. Box 159, Somerset, N.J., 08873. To these three colors were added 5.5 grams of powdered polyterephthalate (TENITE PCDT, trademark of Eastman Chemical Products, Inc., Kingsport, Tennessee 37662) and 5.5 grams kaolin clay. To this was added 4,251.5 grams of a solvent mixture comprising 20 percent by weight methyl isobutyl ketone, 20 weight percent methyl ethyl ketone, and 60 weight percent methanol; whereafter 440 grams of 70% nitrocellulose wet with 30% ethanol were added before closing the container and starting the mixer. The mixture was thoroughly stirred for about eight hours at a high shear rate to properly disperse all solids and dissolve the nitrocellulose. The final mixture contained about 20.3 percent solids and comprised of about 7.75 percent epoxy resin, 5.6 percent nitrocellulose and 6.95 percent other solids including gum-shearing agent, pigments and clay. This coating mixture upon being sprayed upon an uncoated leader strip film comprising cellulose acetate, then drying the strip at 55° C. to remove solvent, resulted in a flexible layer having about 38.2 weight percent epoxy resin, 27.6 weight percent nitrocellulose and about 34.2 weight percent solids including gum-shearing agent, pigments and clay. Approximately six feet of the thus-formed leader strip was spliced to a 16 mm 100 foot reel of film and passed through a projector. Wax or gum build-up was readily removed from all associated parts of the projector without any abrading of the metal surfaces of the projector.

EXAMPLE II

A flexible leader strip coating composition of red color was prepared by mixing in a stainless steel container about 870 grams of No. 20242 red pigment (53% pigment and 47% epoxy resin), produced by Plastics Color Division, Crompton and Knowles Corporation, P.O. Box 159, Somerset, N.J. 08873, 6.0 grams of polyterephthalate (TENITE PCDT, trademark of Eastman Chemical Products, Inc. Kingsport, Tennessee 37662) and 6.0 grams kaolin clay. To this was added 4,638 grams of a solvent mixture comprising 20 percent by weight methyl isobutyl ketone, 20 weight percent methyl ethyl ketone, and 60 weight percent methanol. Whereafter 480 grams of 70% nitrocellulose wet with 30ethanol were added before closing the container and starting the mixer. The mixture was thoroughly stirred for about eight hours at a high shear rate to properly disperse all solids and dissolve the nitrocellulose. The mixture contained about 20.3 percent solids comprised of about 6.82 percent epoxy resin, 5.6 percent nitrocellulose and 7.88 percent other solids including gum-shearing agent, pigments and clay. This mixture upon being sprayed upon a leader strip film comprising cellulose acetate and dried at 55° C., resulted in a flexible layer having about 33.6 weight percent epoxy resin, 27.6 weight percent nitrocellulose and about 38.8 weight percent other solids including gum-shearing agent, pigments and clay. Approximately six feet of the thus-formed leader strip was spliced to a 16 mm 1000 foot reel of film and passed through a projector. Wax or gum build-up was readily removed from all associated parts of the projector without any abrading of the metal surfaces of the projector.

We claim:

1. A leader strip for motion picture film capable of removing gum or accumulation of materials deposited upon motion picture equipment, consisting of a flexible strip capable of being passed through an apparatus having a mechanism for moving motion picture film therethrough, said strip being made of a composition selected from the group consisting of cellulose esters and polyesters, said strip having bonded upon at least one surface thereof a gum-removing layer, said layer comprising an organic binder, said organic binder being a member selected from the group consisting of cellulose nitrate, cellulose acetate, cellulose acetate-butyrate, cellulose acetate-propionate, polyurethanes, polyacrylonitriles, copolymers of acrylonitrile and vinylidene chloride, epoxy resins and mixtures thereof, and a gum-shearing agent of finely divided polymeric particles evenly dispersed and anchored to the surface by said binder, said polymeric particles being a member selected from the group consisting of polyesters, polyamides, polyimides, and polyolefins, said particles having a diameter less than about five mils and being substantially spheroidal in shape wherein said gum-shearing agent is about 0.1 to about 10 percent by weight of the total gum removing layer and the thickness of said gum removing layer is in the range of about 1 to 1.5 mils.

2. Flexible strip as recited in claim 1 wherein the gum-removing layer includes a clay and pigment.

* * * * *